United States Patent
Plant et al.

(10) Patent No.: US 11,013,978 B2
(45) Date of Patent: May 25, 2021

(54) IN-GAME STRATEGIC INSIGHT WITH REAL-TIME HEAT MAP GENERATION AND HISTORICAL HEAT MAPS

(71) Applicant: International Business Machines Corporation, Armonk, NY (US)

(72) Inventors: Laurence J. Plant, North Balwyn (AU); Stefan Harrer, Hampton (AU); James D. Cleaver, Grose Wold (AU); Sean R. Costello, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 15/994,558

(22) Filed: May 31, 2018

(65) Prior Publication Data

US 2019/0366189 A1    Dec. 5, 2019

(51) Int. Cl.
| | | |
|---|---|---|
| A63B 71/06 | (2006.01) | |
| G06K 9/62 | (2006.01) | |
| G06T 7/90 | (2017.01) | |
| G06T 11/20 | (2006.01) | |
| G06N 20/00 | (2019.01) | |

(52) U.S. Cl.
CPC ........ *A63B 71/0622* (2013.01); *G06K 9/6215* (2013.01); *G06K 9/6267* (2013.01); *G06K 9/6289* (2013.01); *G06N 20/00* (2019.01); *G06T 7/90* (2017.01); *G06T 11/206* (2013.01); *A63B 2071/0647* (2013.01); *G06T 2207/10024* (2013.01); *G06T 2207/20081* (2013.01); *G06T 2207/30196* (2013.01); *G06T 2207/30221* (2013.01)

(58) Field of Classification Search
CPC ...... A61B 71/0622; G06N 20/00; G06T 7/60; G06T 11/206; G06T 2207/100024; G06T 2207/20081; G06T 2207/30196; G06T 2207/30221; G06K 9/6215; G06K 9/6267; G06K 9/6289; A63B 2071/0647; G09B 9/00; G09B 9/003; G09B 29/00
See application file for complete search history.

(56) References Cited

U.S. PATENT DOCUMENTS

| | | |
|---|---|---|
| 7,500,916 B2 | 3/2009 | Lieberman |
| 2014/0236331 A1 | 8/2014 | Lehmann |

(Continued)

OTHER PUBLICATIONS

"Football Matchday Widget Showcase", © Opta 2018, 17 pages, <http://www.optasports.com/football-matchday-widget-showcase.aspx>.

(Continued)

*Primary Examiner* — Timothy A Musselman
(74) *Attorney, Agent, or Firm* — Jay Wahlquist

(57) ABSTRACT

A cognitive coaching method; detecting one or more real-time specific action occurrences during one or more game phases; generating, with a heat map generator, one or more real-time heat maps with one or more specific action label based on the detected one or more real-time specific action occurrences; training a heat map image classifier with an analytics module; transposing one or more historical heat maps comprised in a historical heat map library onto the one or more generated real-time heat maps, in real time, to generate strategic insight on one or more opposing teams; analyzing, using a predictive module, a future potential outcome based on the one or more transposed heat maps; and signaling, to a user, a recommended corrective action deployment strategy based on the analysis of the future potential outcome.

20 Claims, 9 Drawing Sheets

(56) References Cited

U.S. PATENT DOCUMENTS

2015/0024816 A1 1/2015 Ehrens
2015/0235076 A1 8/2015 Aimonen

OTHER PUBLICATIONS

"Optimize your game" FieldWiz 2011-2017 © FieldWiz 10 pages <http://www.fieldwiz.com/>.

Clemente, et al., "Soccer Teams Behaviors: Analysis of the Team's Distribution in Function to Ball Possession", Research Journal of Applied Sciences, Engineering and Technology 6(1): © Maxwell Scientific Organization, 2013, pp. 130-136, <http://www.maxwellsci.com/print/rjaset/v6-130-136.pdf>.

Mell et al., "The NIST Definition of Cloud Computing", National Institute of Standards and Technology, Special Publication 800-145, Sep. 2011, 7 pages.

US 11,013,978 B2

IN-GAME STRATEGIC INSIGHT WITH REAL-TIME HEAT MAP GENERATION AND HISTORICAL HEAT MAPS

BACKGROUND

The present invention relates to machine learning, and more specifically, to generate in-game strategic insight based on future development predictions.

A heat map is a summative graphical representation of data. A heat map is used to visualize a number of parameters contained in a matrix, represented as colors.

SUMMARY

Aspects of the present disclosure are directed to a cognitive coaching method. The method can comprise detecting one or more real-time specific action occurrences during one or more game phases. The method can further comprise generating, with a heat map generator, one or more real-time heat maps with one or more specific action label based on the detected one or more real-time specific action occurrences. The method can further comprise training a heat map image classifier with an analytics module. The method can additionally comprise transposing one or more historical heat maps comprised in a historical heat map library onto the one or more generated real-time heat maps, in real time, to generate strategic insight on one or more opposing teams, where the one or more historical heat maps comprise the specific action label. Next, the method can comprise analyzing, using a predictive module, a future potential outcome based on the one or more transposed heat maps. Lastly, the method can comprise signaling, to a user, a recommended corrective action deployment strategy based on the analysis of the future potential outcome.

Aspects of the present disclosure are further directed to a cognitive coaching system. The system can comprise a computer readable storage medium configured to store instructions, a user interface configured to receive input and present output and a processor communicatively coupled to the computer readable storage medium and the user interface. The instructions can be configured to detect one or more real-time specific action occurrences during one or more game phases. The instructions can further be configured to generate, with a heat map generator, one or more real-time heat maps with one or more specific action label based on the detected one or more real-time specific action occurrences. The instructions can further be configured to train a heat map image classifier with an analytics module. The instructions can additionally be configured to transpose one or more historical heat maps comprised in a historical heat map library onto the one or more generated real-time heat maps, in real time, to generate strategic insight on one or more opposing teams, where the one or more historical heat maps comprise the specific action label. Next, the instructions can be configured to analyze, using a predictive module, a future potential outcome based on the one or more transposed heat maps. Lastly, the instructions can be configured to signal, to a user, a recommended corrective action deployment strategy based on the analysis of the future potential outcome.

Aspects of the present disclosure are further directed to a computer program product for cognitive coaching. The computer program product comprising a computer readable storage medium having program instructions embodied therewith and the program instructions executable. The program instructions can cause the processor to detect one or more real-time specific action occurrences during one or more game phases. The program instructions can further cause the processor to generate, with a heat map generator, one or more real-time heat maps with one or more specific action label based on the detected one or more real-time specific action occurrences. The program instructions can further cause the processor to train a heat map image classifier with an analytics module. The program instructions can additionally cause the processor to transpose one or more historical heat maps comprised in a historical heat map library onto the one or more generated real-time heat maps, in real time, to generate strategic insight on one or more opposing teams, where the one or more historical heat maps comprise the specific action label. Next, the program instructions can cause the processor to analyze, using a predictive module, a future potential outcome based on the one or more transposed heat maps. Lastly, the program instructions can cause the processor to signal, to a user, a recommended corrective action deployment strategy based on the analysis of the future potential outcome.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
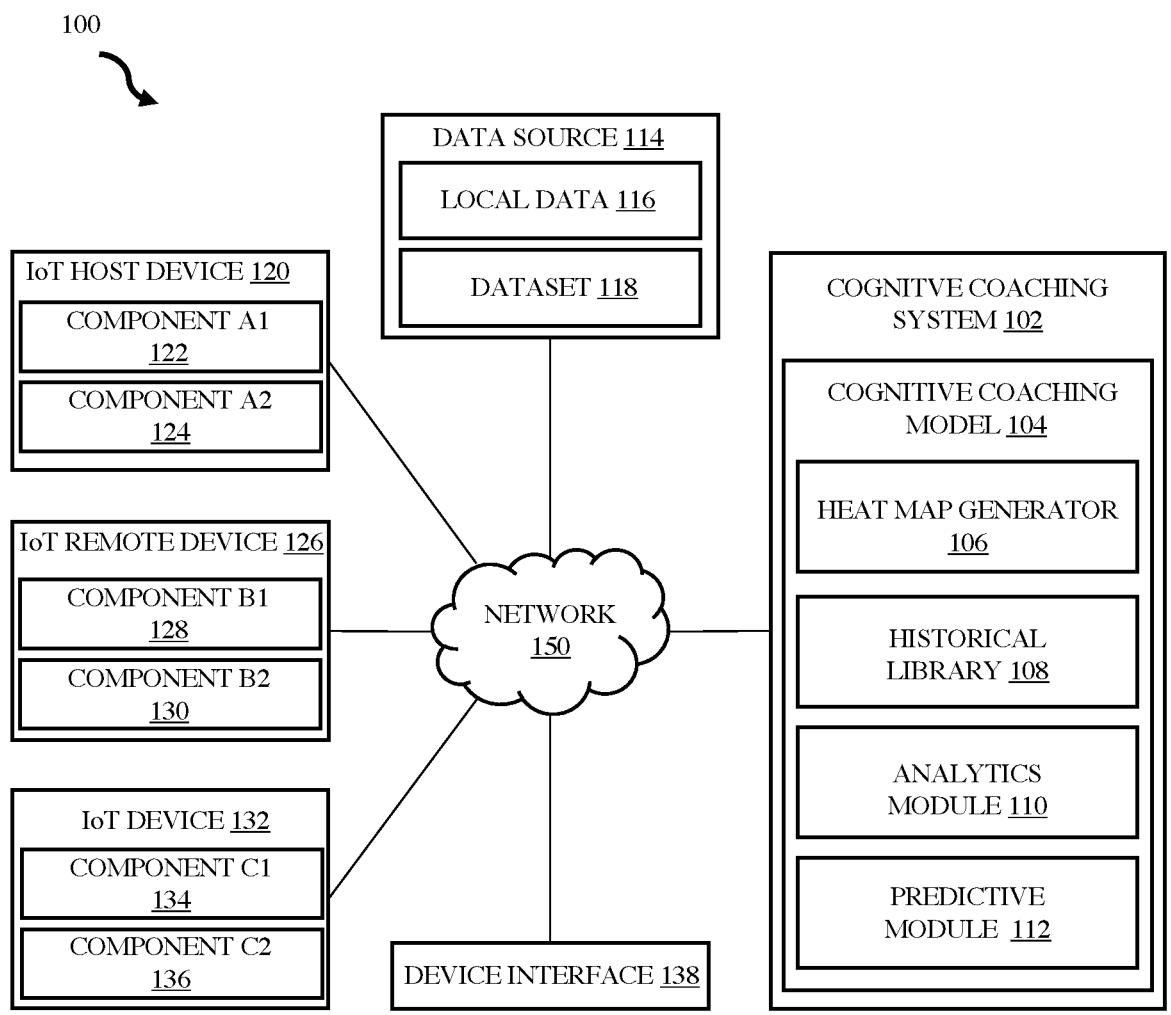
FIG. 1 illustrates a block diagram of an example Internet of Things (IoT) environment in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed to machine learning, and more specifically, to generate in-game strategic insight based on future development predictions represented through a heat map. While the present disclosure is not necessarily limited to such applications, various aspects of the present disclosure may be appreciated through a discussion of various examples using this context.

A heat map can be a visual representation of data in the form of a map or diagram in which data values are represented as colors. Physical heat maps can be, but are not limited to, multi-dimensional (e.g., 2-D, 3-D), type specific (e.g., web, biology, mosaic plot, density function visualization, etc.), color schemed (e.g., rainbow, grayscale, blackbody spectrum), software implementations and other representations of data on a user interface within devices having electronics, hardware, software, sensors, actuators, and/or network connectivity.

A heat map has applications in many industries such as, but not limited to, sports (e.g., soccer pitch, football field, baseball diamond, ice hockey rink, etc.), environmental (e.g., ocean salinity, seismic activity, weather, etc.), transportation (e.g., traffic control, etc.), military (e.g., combat prevalence, etc.), defense (e.g., surveillance, security), healthcare (e.g., health monitoring, etc.), and so on.

Aspects of the present disclosure relate to generating a cognitive coaching model. In embodiments, a cognitive coach implementation was created to extrapolate in-game strategic insight and perform simulations based on predicted future events. Simulations can be input by a user (e.g., coach X) or augmented in real-time during a game. An understanding of some embodiments of the present disclosure may be improved given the context of the cognitive coaching model.

Some embodiments relate to devices using the cognitive coaching model connected throughout the Internet of Thing (IoT). The IoT can be a network of physical devices generating and sharing data. Physical devices can be, but are not limited to, information processing devices (e.g., computers, laptops, desktops, etc.), consumer devices (e.g., mobile phones, tablets, handheld devices, wearable devices, headphones, etc.), and other devices having electronics, hardware, software, sensors, actuators, and/or network connectivity.

Developing tactics from in-game strategic insight is a highly complex and intuitive task. For example, in athletic competitions (e.g., soccer match), preparation for an upcoming game involves watching historical game film highlighting an opposing team (e.g., opposing team B, opposing team C) and player (e.g., opposing player C, opposing player D) tendencies (e.g., ball movement, interactions, shot selection, etc.) to detect recurring patterns over extended periods of time (e.g., quarters, halves, periods).

Aspects of the present disclosure represent in-game dynamics and coaching tactics as a real-time generated heat map so as to predict future developments of a game using the cognitive coaching model. The real-time generated heat map advises a user (e.g., coach X) on suitable actions to deploy, such that deployment will impact the future development of the game in a favorable way. Using captured parameters (e.g., location, distance/area covered, direction of ball passing/receiving, etc.) and geospatial data points from one or more players point of view, one or more real-time generated heat maps can depict team positioning, player positioning, and player point of view (e.g., lines of sight) that may influence player behavior.

In conventional arts, a heat map can be studied to retrospectively explain the outcome of a momentary game phase (e.g., specific action occurrence occurring during a specific game time). Aspects of the present disclosure propose to correlate historical heat map imagery with real-time heat maps, concurrently in real-time, to derive in-game strategic insight for a specific action occurrence (e.g., goal) team (e.g., team A, opposing team B, opposing team C) and/or a player (e.g., player A, player B, opposing player C, opposing player D). Aspects of the present disclosure further propose to use the derived in-game strategic insight to generate strategic actions to impact the future development of the game, allowing a user (e.g., coach X) to predicatively optimize their in-game strategy, in real-time.

Aspects of the present disclosure realize numerous advantages. For example, aspects of the present disclosure enable a user (e.g., coach X) to utilize one or more databases of historical game data to improve the predictability of a real-time generated heat map personalized to an opposing team and/or an individual team member of the opposing team. Uncharacteristic positional player tactics of opponent behavior can further be detected based on previous heat maps of an individual player and simultaneously provide player recommended actions with correlating justifications.

As another example advantage, aspects of the present disclosure include visually representing in-game attributes of the game for analysis to generate point-of-view visualizations encompassing individual player in-game perspectives. In game attributes can comprise ambient conditions (e.g., dark, light, bright), weather conditions (e.g., rain, wind, turf strength), player equipment (e.g., helmet, cleats, etc.) time of day (e.g., morning, night, etc.), player location (e.g., offensive side, defensive side, etc.) and can help allow coaches to determine if a player was able to see a developing scenario on the field. Distracting visual inputs (e.g., sudden movements, crowd interaction, etc.) and medical information (e.g., vital signs, running speed) can further be considered in calculations. Thus, aspects of the present disclosure account for and are personalized and repeatedly updated based on plurality of actions.

Thus, aspects of the present disclosure aren't necessarily rooted in computer technology at least insofar as aspects of the present disclosure derive in-game strategies by analyzing heat map imagery. Aspects of the present disclosure exhibit at least improved detection (e.g., earlier detection of player movement), improved accuracy (e.g., predictive model), and improved computational performance by reducing the time required to process input information and power consumption.

The aforementioned advantages are example advantages and embodiments that contain all, some, or none of the aforementioned advantages while remaining within the spirit and scope of the present disclosure.

Referring now to FIG. 1, illustrated is a block diagram of an example IoT environment 100. IoT environment 100 can include numerous components communicatively coupled by a network 150 such as, but is not limited to cognitive coaching system 102, data source 114, a plurality of devices (e.g., IoT host device 120, IoT remote device 126, and IoT device 132), and device interface 138.

Cognitive coaching system 102 can include cognitive coaching model 104. Cognitive coaching model 104 can be configured to identify visual data (e.g., player movement, ball movement, player actions, etc.) for respective devices in IoT environment 100 based on local and historical data captured data collected from a data source (e.g., data source 114) and further classify, with a generated label, each image data file for the specific team and/or player they are related to.

Cognitive coaching model 104 can identify dynamic parameters of field events based on, for example, individual player actions (e.g., kicking, passing, etc.), the location of the action (e.g., left side, middle, right side, etc.), results of the action (e.g., goal, foul, etc.), or other factors to generate a respective real-time heat map.

In some embodiments, heat maps are based on one or more counts of information and can be represented in color codes to depict the dynamic evolution of the parameters over time. That is to say, in some embodiments, heat maps are in a format (e.g., easily identifiable) conducive to analysis. However, associated colors (e.g., red, orange, yellow, green, blue, indigo, violet, etc.) representing specific actions are presented by way of example and are not limited to such. In some embodiments, respective generated heat maps can be reused to predict future events and depict new visual data. One or more heat maps are discussed in more detail with respect to FIGS. 4A-4D.

Cognitive coaching model 104 consists of four components: heat map generator 106, historical library 108, analytics module 110, and predictive module 112.

Heat map generator 106 can be configured to create heat maps for an individual player, an ensemble of players (e.g., strikers, midfielders, defenders, etc.), and/or a team at any given point in real-time during a game and/or in a simulated pre-game manner. In embodiments, heat map generator 106 can visually represent the identified dynamic parameters from cognitive coaching model 104. Heat map generator 106 can further be responsible to create a multi-dimensional (e.g., 2-D, 3-D) visual representation of players from one or more point of view or reflecting opposing team dynamics. A player point-of-view historical heat map can illustrate, for example, visible and non-visible players, visible and non-visible areas of the playing surface and/or other limiting factors (e.g., significant movements, lighting, etc.)

Historical library 108 can include internal storage comprising an archive of historical heat maps comprising game and opposing player data. Information comprised within historical library 108 can be uploaded via a wire or wireless connection internally or extracted externally from data source 114. In embodiments, historical heat maps comprised in historical library 108 are retroactively generated with an action specific label, such that, each generated heat map is uniquely connected to an individual player, an ensemble of players, and/or a team, as well as the identity of the game opponent, the point of time it was taken during the game, and the result of the game.

Analytics module 110 can be configured to run an object classifier, which uses image analytics to identify similar games and/or scenarios in the generated real-time heat maps by detecting patterns of historical heat maps generated in historical library 108. In embodiments analytics module 110 can further comprise a heat map image classifier. Analytics module 110 and heat map image classifier is discussed in more detail with respect to FIGS. 3A and 3B.

Predictive module 112 can be configured to produce future outcomes of historic and real-time games and, if strategically advantageous, raise an alert via a recommendation signal to the user (e.g., coach X). Predictive module 112 can further produce an endorsement level of the current in-game strategy. Predictive module 112 is discussed in further detail with respect to FIGS. 3A and 3B.

Cognitive coaching system 102 can collect and distribute dynamic parameters of field events to one or more IoT devices, such as IoT host device 120, IoT remote device 126, and IoT device 132. IoT host device 120 can include component A1 122 and component A2 124. Likewise, IoT remote device 126 can include component B1 128 and component B2 130. Likewise, IoT device 132 can include component C1 134 and component C2 136. Although IoT host device 120, IoT remote device 126, and IoT device 132 are each shown with two components, each device can contain more or fewer components. Although three devices are shown (one IoT host device 120, one IoT remote device 126, and one IoT device 132), embodiments exist containing more or fewer devices (e.g., tens, hundreds, etc.) and embodiments exist containing more or fewer types of devices (e.g., mobile, remote). IoT host device 120, IoT remote device 126, and IoT device 132 can be similar or dissimilar IoT devices such as, but not limited to, computers, servers, industrial equipment, infrastructure, wearable devices, handheld devices, smartphones, tablets, network components, sensors, security cameras, and so on. Respective components (e.g., component A1 122, component B1 128, component 134 C1) in respective devices can be portions of the device used to predict future events. Respective components in respective devices (e.g., component A2 124, component B2 130, and component C2 136) can be portions of the devices generating the alternate colors of the heat map. For example, components can be, but are not limited to, sensors (e.g., temperature sensors, velocity sensors, acceleration sensors, pressure sensors, vibration sensors, movement sensors, global positioning system (GPS) sensors, etc.), memories (e.g., solid state memory, flash memory, volatile memory, non-volatile memory, etc.), processors, network cards, power units, electrical connections and/or cabling, fiber optic connections and/or cabling, displays, actuators, throttles, motors, valves, and so on.

Data source 114 can include local data 116 and dataset 118. Although only one data source 114 is shown in FIG. 1 for purposes of illustration, it is to be understood that more than one data source can be included in other embodiments. Local data 116 can include a history of visual data generated by the devices (e.g., IoT host device 120, IoT remote device 126, and IoT device 132).

Dataset 118 can include historical statistics (e.g., box score, stat sheet, etc.) and motion recording data (e.g., video) (hereinafter referenced and encompassed as image data) not obtained from the devices (e.g. IoT host device 120, IoT remote device 126, and IoT device 132). In some embodiments, dataset 118 can be used by heat map generator 106 to retroactively generate heat maps comprising generic and specific data.

Device interface 138 can be a computer processing unit (CPU) and/or a graphics processing unit (GPU) and can communicate information from cognitive coaching system 102 to other components to be used for further processing done by conventional systems on this type of data. Device interface 138 can signal an alert to the user of a future recommendation. Signaling an alert is discussed in more detail with respect to FIGS. 3A and 3B.

FIG. 1 is intended to represent illustrative components of an example IoT environment 100 according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1.

Figure 2:
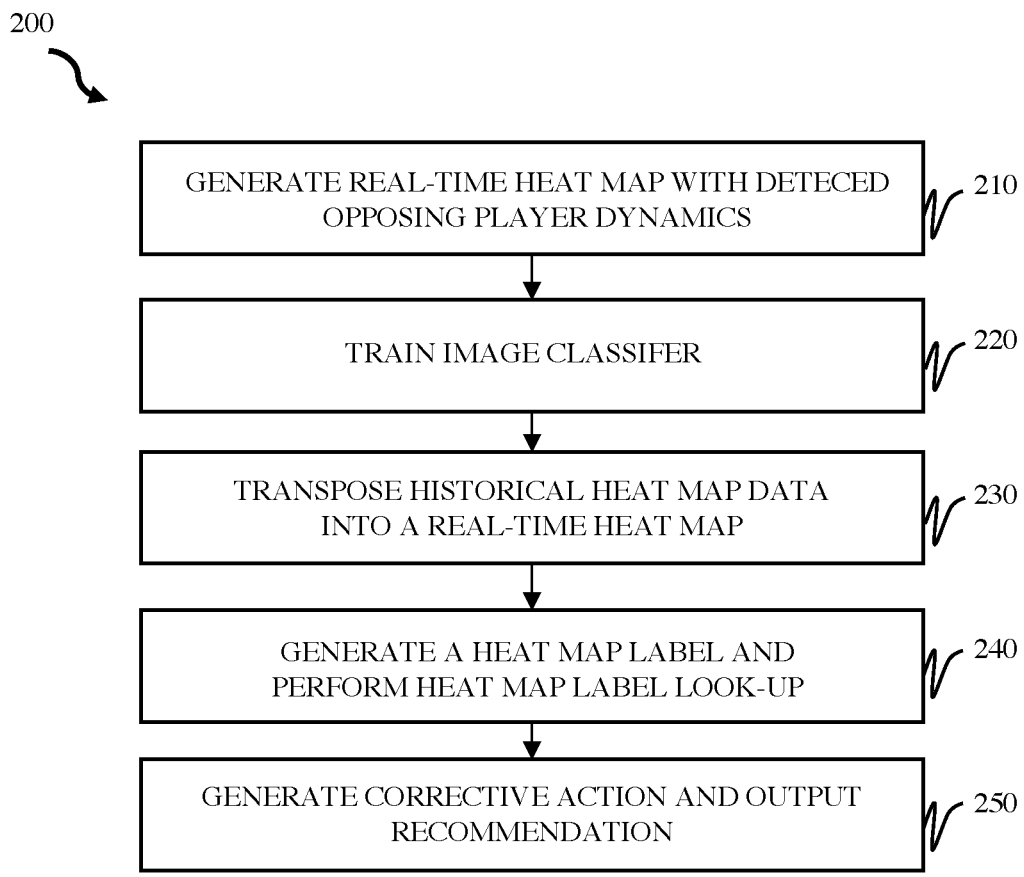
FIG. 2 illustrates a flowchart of an example method for heat map cognitive coaching in accordance with some embodiments of the present disclosure.

Referring now to FIG. 2, illustrated is an example method 200 for heat map cognitive coaching in accordance with some embodiments of the present disclosure. The method 200 can be performed by, for example, one or more processors, a cognitive coaching model (e.g., cognitive coaching model 104 of FIG. 1), or a different configuration of software. For clarity, the method 200 will be described as being performed by the cognitive coaching model, however, aspects of the present disclosure can be performed by other software components or combinations of software components. In some embodiments, aspects of the method 200 are consistent with IoT environment 100 of FIG. 1.

In operation 210, the cognitive coaching model receives and/or gathers device data uploaded from a plurality of devices communicatively coupled in a network and detects in-game coaching patterns and player tendencies as they are likely to occur. Using the data gathered, the cognitive coaching model, at operation 210, generates a real-time heat map for a specific action occurrence. In embodiments, the plurality of devices can comprise an IoT environment (e.g., IoT environment 100 of FIG. 1). Uploaded device data can include, but is not limited to, heat map information representing an opposing team's movement between one or more players (e.g., opposing player C, opposing player D) and coaching tactics employed by an opposing coach (e.g., opposing coach Y). For example, in embodiments, the cognitive coaching model, operated by coach X, who represents team A, can detect ball passing patterns relating to opposing player C and opposing player D during different stages of a game (e.g., first quarter, third quarter) as well as additional in-game strategies (e.g., defensive schemes, offensive schemes, etc.), as deployed by opposing coach Y, who represents opposing team C.

Detection can occur using an image classifier comprised in the analytics module (similar to analytics module 110 of FIG. 1) comprised within the cognitive coaching module. In operation 220, the image classifier is trained to detect historical heat maps comprised in the historical library. Historical heat maps can correlate with one or more game phases indicating a specific action occurrence (e.g., goal, time outs, penalties, etc.). During the real-time occurrence of such specific action occurrences, the image classifier can initiate a notification to the user (e.g., coach X) in which the recorded event is likely to occur again, based on the existing real-time conditions and similarities exiting in a specific historical heat map. A game phase can represent a time period (e.g., minutes) within the likely action occurrence. A notification can represent a color specific alert (e.g., blinking light) associated with the detected game phase. In embodiments, for example, a detected specific action within 5 minutes of occurring can issue a red alert, a specific action within 15 minutes of occurring can issue a yellow alert, and a specific action within 30 minutes of occurring can issue a green alert. Each alert can be scaled to represent the average game phase during previous games when specific actions occur (e.g., opposing player scores a goal). Additionally, the time period with the alert is scaled in some embodiments. For example, based on a 90 minute game, the red alert can indicate the action occurrence will occur within 5% time, the yellow alert can indicate the action occurrence will occur within 15% time, and the green alert can indicate the action occurrence will occur within 30% time.

In embodiments, the image classifier is a standard machine learning pattern recognition classifier which uses conventional methods familiar in the art to establish specific action occurrence classification.

In embodiments, a heat map generator (similar to heat map generator 106 of FIG. 1) can be configured by coach X, to run in real-time with the trained image classifier, at game time start. During a detection of a specific action occurrence and issuance of an alert (e.g., yellow alert), at operation 230, the analytics module of the cognitive coaching model transposes the historical heat map of the specific action occurrence into the real-time generated heat map. In embodiments, for example, the analytics module can identify that an opposing players (e.g., opposing player D) positioning resembles a specific historical action occurrence and then issue an alert at block 230. In response to the issuance, the cognitive coaching system obtains the previously produced historical heat map reflecting the opposing player positioning (opposing player C), as well as an additional historical heat map reflecting the historical opponents (e.g., opposing team B during such action, and overlays the gathered historical information into the current produced heat map at block 230. The transposed heat map can then enable, for example, coach X, to visually identify, for example, opposing coach Y's in-game strategy and appropriately formulate a counter reaction, using information determined from the configuration of opposing teams B.

In alternative embodiments, one or more heat maps representing individual players, individual teams, and/or subsets thereof can be trained on historic information and additionally transposed into a real-time generated heat maps relating to one or more teams and/or specific interest of one or more coaches.

In embodiments, a real-time generated heat map can depict that the opposing team's offensive is, for example, concentrated around opposing player C on the left side of the field. In operation 240, a heat map classifier of the cognitive coaching model, coupled to the heat map generator, generates a heat map label reflecting the specific action occurrence that is occurring. Accessing the historical library, the cognitive coaching model can additionally search for near identical and/or similar labels reflecting opposing player C on the left side of the field.

If such historical evidence is found, the predictive module of the cognitive coaching model generates a corrective action (deployable by coach X) in operation 250 to reduce a likelihood of the predicted opposing action occurring again. The cognitive coaching model can simulate implementation by using the predictive module to analyze the new generated corrective action heat map with one or more historical heat maps inducing similar alerts (e.g., yellow alert of operation 230). Based on the results, the predictive module can determine if a resemblance exists between the one or more heat maps. In embodiments, if a resemblance exists, the cognitive coaching model can signal the user (e.g., coach X) that the corrective action does not mitigate the potential future specific action occurrence and further requires additional simulation processing (e.g., repeating operations 210-240). However, in response to a determination that one or more resemblances between historical heat maps and the new-in game corrective action heat map do not occur, the cognitive coaching model can output a corrective recommendation to the user (e.g., Coach X), such that implementing the corrective action is a tactically effective in-game strategy to avoid the potential problematic outcome. In embodiments, inferencing is based on confidence level simulations and is explained in more detail with respect to FIGS. 3A and 3B. Generating a corrective action is repeated until no further alerts are initiated. Some embodiments of the predictive module are discussed in more detail with respect to FIGS. 3A and 3B.

In embodiments, an alert (e.g., red, yellow, green) can be transferred via a wire or wireless connection through a network (similar to network 150 of FIG. 1) to one or more devices in the IoT environment (similar to IoT host device 120, IoT remote device 126, and IoT device 132 of FIG. 1) operated by a user (e.g., coach X) and displayed on the device interface (similar to device interface 138 of FIG. 1).

In embodiments, the one or more heat maps (e.g., historical opponent, corrective action, etc.) can further be displayed on the device interface (similar to device interface 138 of FIG. 1) of one or more devices in the IoT environment (similar to IoT host device 120, IoT remote device 126, and IoT device 132 of FIG. 1).

Labeled historical heat maps can be based on the data collected from each respective IoT device and/or the cognitive coaching model and stored in a data source (similar to data source 114 of FIG. 1). Each IoT device can be connected to one or more data sources comprising generic image data via wired or wireless connection.

FIG. 2 is intended to represent illustrative operations of an example method for heat map cognitive coaching in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3A:
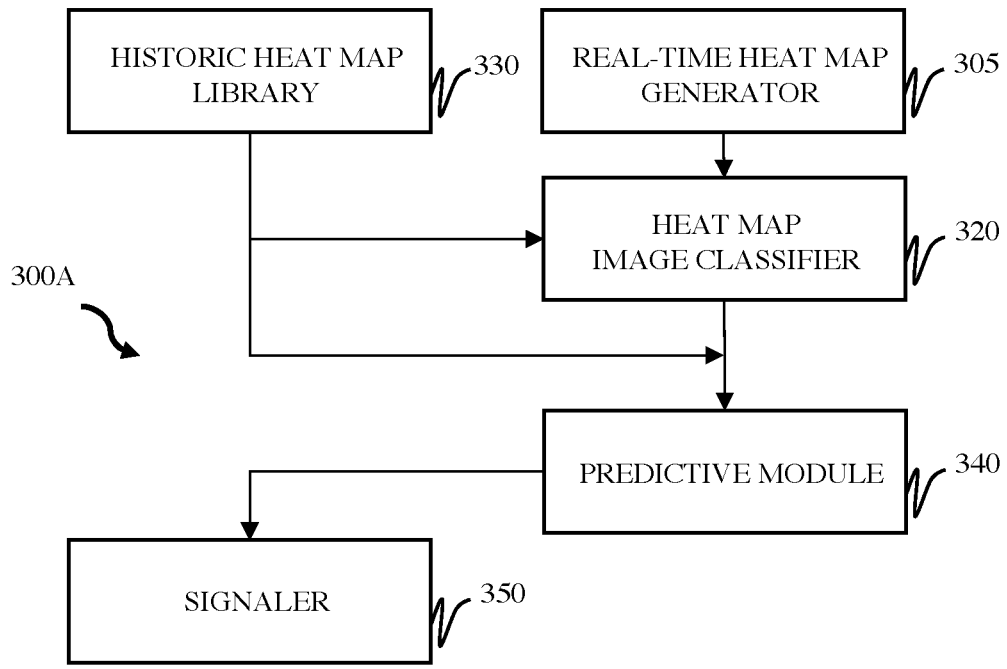
FIGS. 3A and 3B illustrates a flowchart of an example system architecture for heat map analysis in accordance with some embodiments of the present disclosure.

Referring now to FIG. 3A, illustrated is an example system architecture 300A for real-time heat map analysis in accordance with some embodiments of the present disclosure. In some embodiments, system architecture 300A is consistent with the cognitive coaching system 102 of FIG. 1 and the method 200 of FIG. 2. In various embodiments, system architecture 300A performs some of the actions described in FIGS. 1 and 2, such that the cognitive coaching system executes the method, or a portion of the method, based on components provided by the system architecture 300A.

System architecture 300A can comprise real-time heat map generator 305. Real-time heat map generator 305 can be comprised in a cognitive coaching model (similar to cognitive coaching model 104 of FIG. 1). Real-time heat map generator 305 can be, for example, configured to create one or more real-time heat maps for an individual player, an ensemble of players and/or a team at a time specific instance (e.g., $17^{th}$ minute) or throughout the duration of a game. In embodiments, real-time refers to the actual time during which a process or an event occurs. The one or more real-time heat maps can represent information as requested by the user (e.g., coach X). Information can comprise, but is not limited to, ball movement (e.g., team ball possession, etc.), player average location (e.g., player positioning, etc.), geospatial data (e.g., player point of view, etc.), and player performance (e.g., running speed, shot location, vitals, etc.).

Real-time heat map generator 305 is coupled to heat map image classifier 320. In embodiments, heat map image classifier 320 is responsible for detecting the real-time specific action occurrence within the generated real-time heat map from real-time heat map generator 305 and further classifying the simulation with a heat map label. A heat map label is a summative representation of the specific action occurrence, occurring in the generated heat map. For example, in embodiments, at the $20^{th}$ minute mark of the first half, the real-time heat map generator can detect opposing team B's offense is concentrated around player B on the left side of the field. The heat map image classifier can then generate a representative label, such as "(minute(20)-player (B)-position(Offense)-brief description(left side focus)," and/or some variation thereof. The heat map with the representative label can then be stored store for future iterations.

In embodiments, heat map image classifier 320 can perform the method comprised within operation 220 of FIG. 2. In response to a determination by heat map image classifier 320 that data points and patterns (described in more detail with respect to FIG. 4A-4D) comprised within one or more generated heat maps correlate to one or more real-time specific action occurrence during one or more game phases, then the cognitive coaching system can use historical heat library 330 to find one or more previously stored historical heat maps with a similar representative label of interest. Heat map image classifier 320 can further be comprised within an analytics module (similar to analytics module 110 of FIG. 1) and use image analytics, captured by one or more devices in the IoT environment, to identify similar in-game scenarios through pattern detection. Pattern detection (pattern recognition) is the assignment of a common label between a given input value and an alternative action and can further use conventional in the art methods of machine learning, comprising but not limited to, scaling, clustering, and classification between image (e.g., generated heat map image) data points (e.g., pixel values). One or more generated labels of interest can comprise previously generated heat map labels that reflect heat map data closely assimilated from real-time heat map generator 305. In embodiments, representative labels of interest can further relate to operation 240 of FIG. 2.

The heat map image classifier 320 can additionally be coupled to historical heat map library 330 and predictive module 340. In embodiments, historical heat map library 330 (similar to historical heat map library 108 of FIG. 1) is a compilation of previously labeled and generated real-time heat maps, stored within the cognitive coaching system comprising a plurality of action specific and game player data. Using one or more counts of information (e.g., similar labeled heat maps) comprised within historical heat map library 330, heat map image classifier 320 is responsible for determining if sufficient evidence exists between a generated labeled heat map and a historical labeled heat map, relating to a specific action occurrence. If sufficient evidence can be determined between the one or more historical heat maps and a real-time generated heat map, the cognitive coaching system can derive a predictive information strategy implementation.

Sufficient evidence refers to a similarity of data points between the one or more historical heat maps and the one or more generated real time heat maps, matching and/or exceeding a confidence level set by the user (e.g., coach X). Determining the strength of comparison is conducted in the machine learning aspect (similar to analytics module 110 of FIG. 1) of the cognitive coaching system and further using heat map image classifier 320 to define the degree of overlap. In embodiments, one or more historical heat maps comprising, for example, at least an 80% match as set by the user (e.g., coach), in recurring patterns of player parameters (e.g., individual player and/or ball movement, offensive formations, etc.) on a transposed generated real-time heat map, can be determined to be sufficient evidence and cause the cognitive system to produce the predictive information strategy implementation.

To reach the confidence level, one or more generated heat maps are repeatedly gathered throughout the entirety of the match (e.g., soccer game). The generated heat map can be gathered repeatedly to reflect each specified increment of time (e.g., n seconds and/or n minutes, and so forth, wherein n can be a user-defined variable or a preset value). Every real-time generated heat map is timestamped according to correlating time in the game it was generated at and further identified with a label representing the specific action occurrence. The newly timestamped and labeled generated real-time heat map is then compared against one or more historical heat maps, comprised in historical heat map library 330, containing one or more similar and/or identical specific action occurrences for an opposing team (e.g., opposing team B) and a similar and/or identical timestamp during one or more previous played game.

One or more historical heat maps satisfying the user (e.g., coach X) set confidence level (e.g., 80%) are transferred to predictive module 340. In embodiments, predictive module 340 makes a prediction on the likelihood a favorable future sequence of a specific action occurrence will occur, within a confidence interval. The confidence interval can be established from the previously set confidence level and additional data derived in predicted module 340. The confidence interval enables the cognitive coaching system to make a binary decision such that future in-game strategic actions deployed by the user (e.g., coach X) would yield a favorable outcome. If favorable future developments are predicted to occur based on the current information between the generated real-time heat map and historical heat maps, predictive module 340 can produce an alert. When the confidence level has been satisfied, and no resemblances with the real-time simulated heat map further exist, the alert can be deleted which can indicate to the user (e.g., coach X) that a strategic deployment is effective.

In embodiments, an alert can comprise a notification (e.g., flashing light, script, text, etc.) including a color indicating the dynamic evolution of in-game parameters over time as well as a recommended strategy change with deployment justifications based on the input from historic heat map library 330. The notification can be transferred form predictive module 340 and issued to the user (e.g., coach X) via signaler 350. In embodiments, the recommendation strategy will comprise strategic in-game insight, based off historical events, to deploy so as to mitigate potential negative predictive outcome or yield a positive result. Because real-time heat map generator 305 is continually in the 'ON' state throughout a match, the cognitive coaching system will monitor and repeatedly signal a recommendation to the user (e.g., coach X) during different game phases, should they be necessary. A validation update can then be initiated by real-time heat map generator 305 to compare the newly generated real-time heat map reflecting the deployed strategy (e.g., coaching adjustments) with the resulting outcome.

Figure 3B:
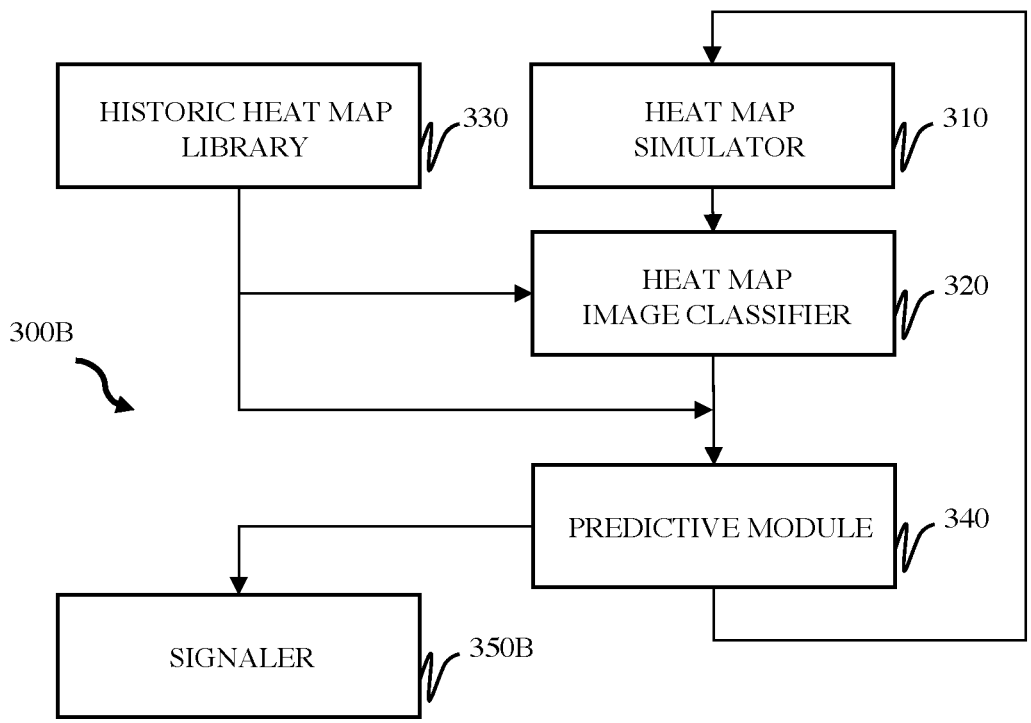

In FIG. 3B, illustrated is an example system architecture 300B for simulated heat map analysis in accordance with some embodiments of the present disclosure. In some embodiments, system architecture 300B is consistent with the cognitive coaching system 102 of FIG. 1 and the method 200 of FIG. 2. In various embodiments, system architecture 300B performs some of the actions described in FIGS. 1 and 2, such cognitive coaching system executes the method, or a portion of the method, based on components provided by the system architecture 300B.

System architecture 300B can comprise heat map simulator 310. Heat map simulator 310 can be comprised in the cognitive coaching model (similar to cognitive coaching model 104 of FIG. 1). Heat map simulator 310 can be, for example, configured to create one or more simulations based on historical information (e.g., previous game film, previous game analytics, etc.). Simulations can comprise one or more imitated specific action occurrences input by a user (e.g., coach X) such as to reflect one or more potential in-game situations (e.g., corner kick, free kick, man-advantage) a team may encounter when playing an opposing team (e.g., team B). Historical information can include, but is not limited to, previous opposing team game film and previous game analytics (e.g., shots taken, goals score, recorded saved, number of penalties, etc.). Using the user input information and tactics derived from historical information, heat map simulator 310 can create a simulated heat map based on, but not limited to, team movement dynamics (e.g., team average possession, etc.), player average location (e.g., player positioning, etc.), geospatial references (e.g., player point of view, etc.), and team performance (e.g., running speed, shot location, vitals, etc.) during a simulated specific action occurrence. Simulated heat maps can further represent an individual player, an ensemble of players and/or a team at a time-specific instance (e.g., $17^{th}$ minute) or throughout the duration of a game.

Heat map simulator 310 is coupled to heat map image classifier 320. In embodiments, heat map image classifier 320 is responsible for detecting the simulated specific action occurrence within the simulated heat map from heat map simulator 310 and further classifying the simulation with a heat map label. A heat map label is a summative representation of the simulated specific action occurrence, occurring in the simulated heat map. For example, in embodiments, the heat map simulator can simulate a tactic an opposing team may deploy at the $20^{th}$ minute mark of the first half, when the opposing team has been awarded a free kick on the left offensive side of the playing surface (e.g., soccer pitch). The real-time heat map generator can detect opposing team B's offense is concentrated around player C on the left side of the field. The heat map image classifier 320 then generates a representative label, such as "(minute(20)-player(opposing team B)-position(Offense)-brief description(free kick left side)," and/or some variation thereof.

In embodiments, heat map image classifier 320 can perform the method comprised within operation 220 of FIG. 2. In response to the simulation, the cognitive coaching system can use historical heat library 330 to find one or more previously simulated action specific occurrence heat maps matching the simulated label of interest. Coupled to historical heat map library 330, system architecture 300B uses historical image analytics, captured by one or more devices in an IoT environment, to supply data for predictive module 340 so that future simulations distinguishing favorable in-game strategies can occur.

In embodiments, historical heat map library 330 (similar to historical heat map library 106 of FIG. 1) is a compilation of previously labeled and simulated heat maps, stored within the cognitive coaching system comprising a plurality of action specific and game player data. Using one or more counts of information (e.g., similar labeled heat maps) comprised within historical heat map library 330, heat map image classifier 320 is responsible for determining if sufficient evidence exists between a simulated labeled heat map and a historical-based simulated labeled heat map, relating to the simulated specific action occurrence. If sufficient evidence can be determined between one or more simulated heat maps and a historical-based simulated labeled heat map, the cognitive coaching system derives a predictive information strategy implementation.

Sufficient evidence refers to a similarity comparison between data points, comprised between the one or more historical simulated heat map and the one or more heat map generated from heat map simulator 310, matching and/or exceeding a confidence level set by the user (e.g., coach X). Determining the strength of comparison is conducted in the machine learning aspect of the cognitive coaching system and further, the heat map image classifier 320 can define the degree of overlap. In embodiments, one or more simulated historical heat maps comprising, for example, at least an 80% match as requested by the user (e.g., coach) of recurring patterns in player parameters (e.g., individual player and/or ball movement, offensive formations, etc.), on a transposed generated heat map simulation, can cause the cognitive system to produce the predictive information strategy implementation.

To reach the confidence level, a simulated heat map is cross referenced against one or more historical simulated heat maps containing one or more similar and/or identical specific action occurrences for an opposing team (e.g., opposing team B) and a similar and/or identical timestamp during one or more previous played games.

In embodiments, predictive module 340 makes a predicted simulation of the likelihood a favorable future sequence of a specific action occurrence will occur with a confidence interval. The confidence interval can be established from the previously set confidence level and additional data derived in predicted module 340. The confidence interval enables the cognitive coaching system to make a binary decision such that future in-game strategic actions deployed by the user (e.g., coach X) would yield a positive result. In such a determination, the output is transferred, via signaler 350 and alerted to the user (e.g., coach X).

However, in embodiments, in response to a determination the simulation yields a non-favorable future development, based on the current information between the simulated heat map and simulated historical heat maps and/or information obtained during a validation update, the simulation is reconfigured in heat map simulator 310 and iterations of operations performed by system architecture 300B repeat until such simulation yields a positive result.

In embodiments, the heat map simulator 310 is initially fed with specific strategic configurations of choice which are then evaluated against historical heat maps leading to either an alert signaling unfavorable or favorable strategy indications. In alternative embodiments, the process of repeatedly simulating real-time heat maps during a game can be used to determine the predicted favorable outcome of a deployed specific action occurrence.

FIGS. 3A and 3B are intended to represent illustrative operations of example system architectures in accordance with some embodiments of the present disclosure. Components of FIGS. 3A and 3B can be implemented such that, for example, generator 305 can be a processor executing instructions to cause the processor to perform the functions of the classifier. Classifier 320 can be an algorithm to dictate and assign respective operations. Heat map library 330 can be a wire or wireless storage media (e.g., hard drive, cloud, etc.) connected to the cognitive coaching system. Signaler 350 can be an interface (e.g., visual display, light, speaker, etc.) to produce, visual and audio indicators. In some embodiments, however, individual operations can have greater or lesser complexity than shown in FIGS. 3A and 3B, and operations in addition to (or in substitution of) those shown in FIGS. 3A and 3B can be present. Furthermore, in some embodiments, various operations illustrated in FIGS. 3A and 3B can have greater, lesser, or different functionality than shown in FIGS. 3A and 3B. Furthermore, in some embodiments, various operations illustrated in FIGS. 3A and 3B can occur in different orders, if they occur at all.

FIGS. 4A, 4B, 4C, and 4D illustrate diagrammatic depictions for the example process described with respect to FIGS. 2, 3A and 3B, to generate one or more real-time heat maps, in accordance with embodiments of the present disclosure.

Figure 4A:
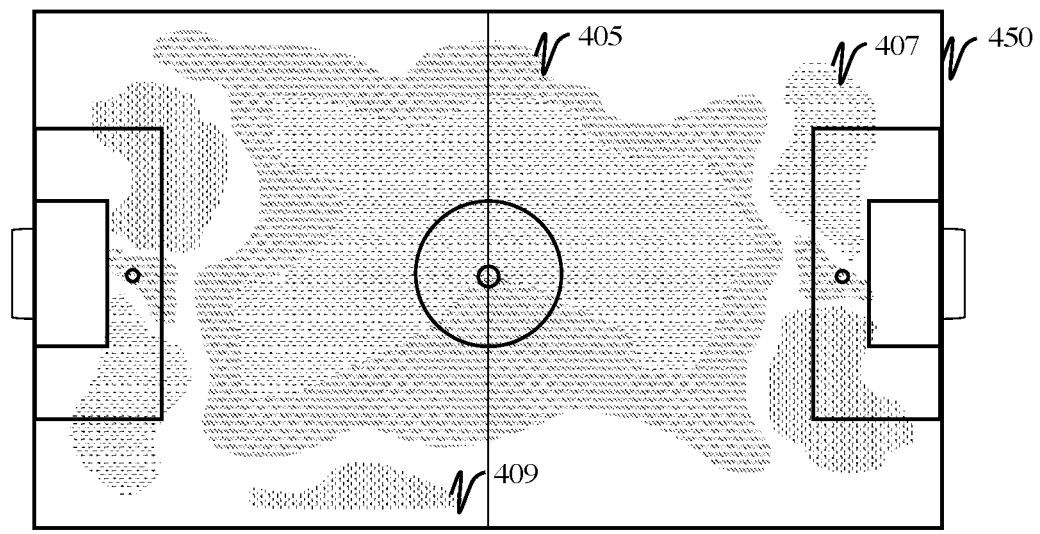
FIGS. 4A, 4B, 4C, and 4D illustrate diagrammatic depictions of example heat maps in accordance with some embodiments of the present disclosure.

As depicted in FIG. 4A, opposing real-time team possession of a ball during, for example, a first-half on playing surface 450 (e.g., soccer pitch) is indicated on the heat map of FIG. 4A via opposing team possession regions 405, 407, and 409. Opposing team possession regions 405, 407, and 409 can be generated in a similar manner using heat map generator 305 of FIG. 3A (or heat map generator 106 of FIG. 1). For example, opposing team possession regions 405, 407, and 409 representing opposing team B, can be used to analyze in-game strategic insights and further determine potential future events by comparing the opposing possession tendencies in one or more stored opposing team B historical heat maps (comprised in heat map library 106 of FIG. 1).

In embodiments, various areas of opposing team possession comprised on playing surface 450 can be indicated by one or more corresponding regions. For example, each of one or more regions on the heat map of FIG. 4A can represent the real-time in game tendency (e.g., high, medium, low, etc.) an opposing team (e.g., team B) possesses the ball in one or more corresponding locations comprised throughout playing surface 450. For example, opposing team possession region 407 of playing surface 450 can visually indicate high concentrative ball movement represented with a horizontal hyphen. Opposing team possession region 405 of playing surface 450 can visually indicate medium concentrative ball movement represented with a diagonal hyphen. Opposing team possession region 409 of playing surface 450 can visually indicate low concentrative ball movement represented with a vertical hyphen.

In embodiments, minimal ball movement in one or more area on playing surface 450 need not be visually represented with a hyphen. In embodiments, the visual representation use of a hyphen is only provided by way of example and visual representation of the level of ball possession is not limited to such. In various alternative embodiments, the ball movement representation can be further depicted by use of color. For example, in some such embodiments, high ball movement areas are visually indicated with red, medium ball movement areas are visually indicated with yellow, and low ball movement areas are visually indicated with blue. It is to be understood that the specific colors used can vary and are not limited to the example colors discussed herein.

Figure 4B:
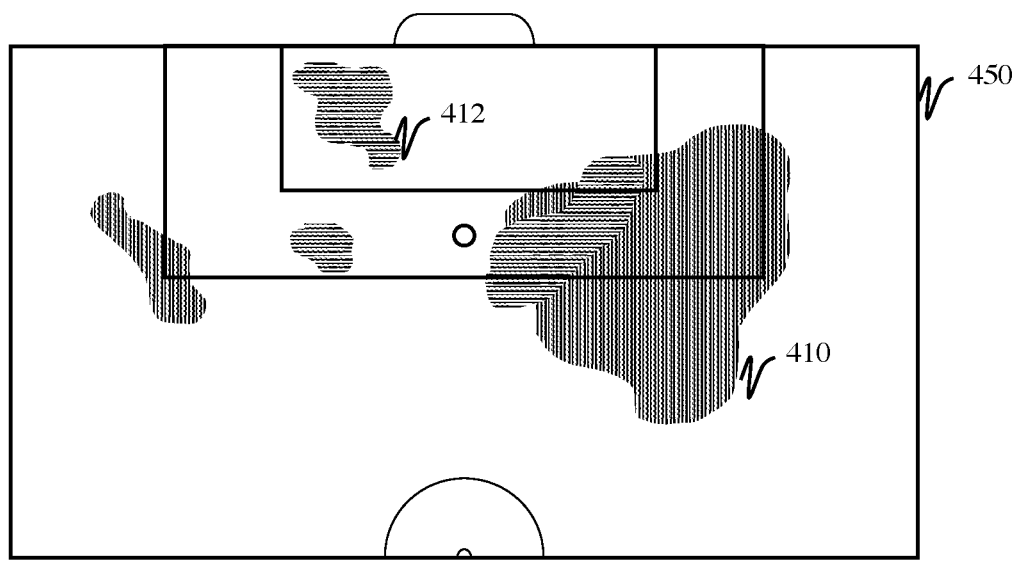

In FIG. 4B, accumulated positioning during a game phase (e.g., $1^{st}$ half) on playing surface 450 (e.g., soccer pitch) is indicated via accumulated player position regions 410 and 412. Accumulated player position regions 410 and 412 can be generated in a similar manner using heat map generator 305 of FIG. 3A (or operation 210 if FIG. 2 or heat map generator 106 of FIG. 1). For example, accumulated positioning of two or more opposing players (e.g., opposing player B, opposing player C) is indicated in respective regions by two or more different visual representations. For example, accumulated player position region 410 corresponding to a first player is depicted with a horizontal bar and accumulated player position region 412 corresponding to a second player is depicted with vertical bars. The accumulated player position regions 410 and 412 can be used to analyze in-game strategic insights and further determine potential reactions to future deployed strategies.

One or more regions of playing surface 450 can visually indicate the positioning of one or more corresponding players during a specific action occurrence. For example, one or more regions of horizontal bars (such as regions 410) can represent an accrued representation of an offensive opposing player (e.g., opposing player C) positioning during a corner kick at a specified game phase (e.g., 1$^{st}$ half). Similarly, one or more regions of vertical bars (such as regions 412) can represent an accrued representation of a defensive opposing player (e.g., opposing player D) positioning during a corner at a specified game phase (e.g., 1$^{st}$ half).

In embodiments, the visual representation using horizontal and vertical bars is only provided by way of example and visual representation of accumulated player positioning is not limited to such. In various alternative embodiments, the accumulated player positioning can be depicted by use of color or other visual indication. For example, in some such alternative embodiments, offensive positioning areas are visually indicated with red and defensive accumulated positioning are visually indicated with blue and or some combination thereof. Accrued positioning can further represent the accrued positioning of an ensemble of players (e.g., defenders) and/or the goalie's movements, for example.

Figure 4C:
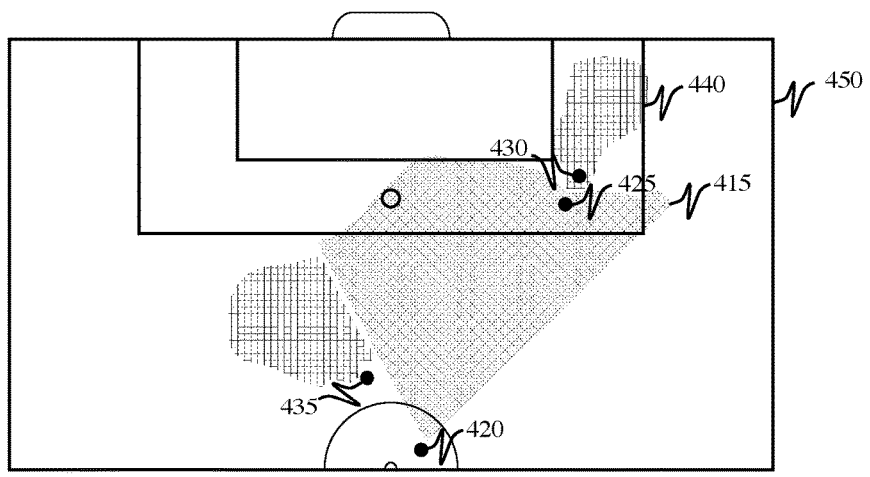

Referring now to FIG. 4C, player point of view indicated, for example, by visual arc 415 on playing surface 450 (e.g., soccer pitch) is identified. In embodiments, visual arc 415 can be generated, using geospatial data, with heat map simulator 310 of FIG. 3B. FIG. 4C can be the generated point of view of player A 420 in a simulated previously played situation. Player B 425, opposing player C 430 and opposing player D 435 can further be depicted in the example heat map shown in FIG. 4C. In embodiments, for example, visual arc 415 can indicate to a user (e.g., coach X) the simulated view player A 420 had during his intercepted pass by opposing player C 430, which can then be used in subsequent coaching sessions with one or more players. The example heat map shown in FIG. 4C can additionally display the occluded view 440 region player A 420 is unable to accurately see because it is obstructed by one or more players (e.g., player B, opposing player D).

Alternatively, in-game attributes can further be included on the example heat map shown in FIG. 4C so as to depict additional elements that may have contributed to the specific action occurrence. Additional in-game attributes (not pictured) can comprise ambient conditions (e.g., dark, light, bright), weather conditions (e.g., rain, wind, turf strength), and the time of day (e.g., morning, night, etc.), to further enable a user (e.g., coach X) to determine if a player was able to see a developing scenario on the field. Distracting visual inputs (e.g., sudden movements, crowd interaction, etc.) and medical information (e.g., vital signs, running speed) can further be considered in the example heat map shown in FIG. 4C.

In embodiments, for example, the simulated visual arc 415 player A 420 had during his intercepted pass is represented by one or more dotted regions (.) . . . . Additionally, in the example of FIG. 4C, the occluded view 440 player A 420 had, which led to the interception of his pass from player C 430, is represented by one or more boxed regions (box). However, the example visual representation using dotted or boxed regions is only presented by way of example and visual representation of visual arc 415 and occluded view 440 region are not limited to such. In various alternative embodiments, the various regions can be further depicted by use of color or other visual indication, such as hash marks. For example, in some example embodiments, a visual region player A 420 is able to see can be indicated with green and an occluded (e.g., blocked by a player) visual region for player A 420 can be indicated with red and/or some combination thereof.

Figure 4D:
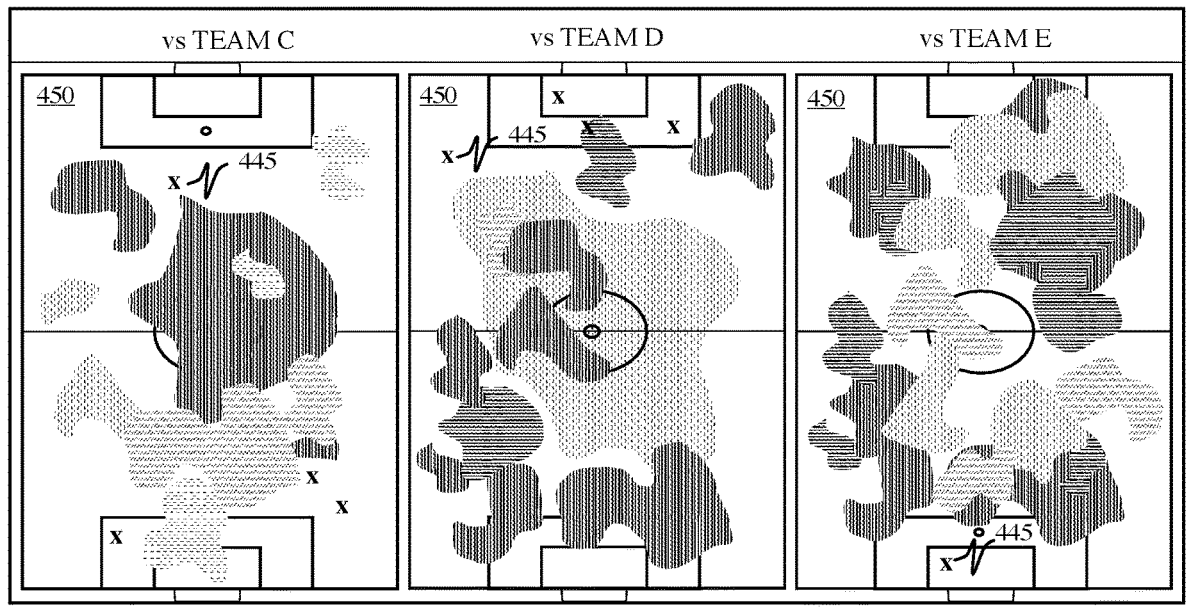

FIG. 4D illustrates opposing team performance metrics 445, indicated on one or more historical heat maps of playing surface 450, representing previous team performance against one or more alternative opposing teams (e.g., opposing team C, opposing team D, opposing team E). FIG. 4D can comprise any of the dynamics (team possession 405, accumulated positioning 410, visual arc 415, occluded view 440, etc.) previously mentioned in FIGS. 4A-4C. Team performance metrics 445 can represent, but are not limited to, the identified location of a goal scored (represented as an x).

It is noted that FIGS. 4A-4D are intended to depict one or more heat maps. In some embodiments, however, individual components can have greater or lesser complexity than as represented in FIGS. 4A-4D, components other than or in addition to those shown in FIGS. 4A-4D can be present, and the number, type, color and configuration of such components can vary.

Figure 5:
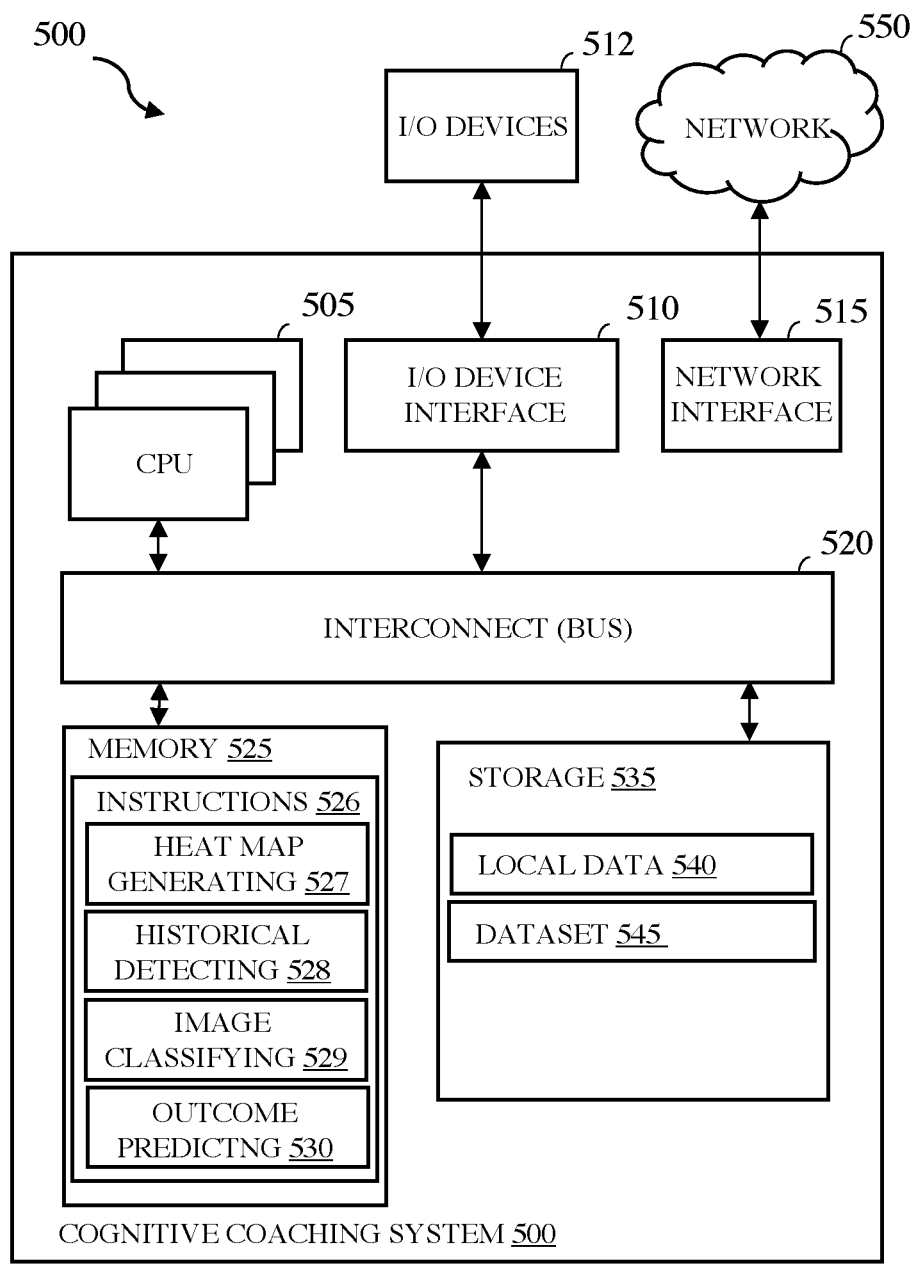
FIG. 5 illustrates a block diagram of an example cognitive coaching system in accordance with some embodiments of the present disclosure.

FIG. 5 illustrates a block diagram of a cognitive coaching system 500 in accordance with some embodiments of the present disclosure. In some embodiments, cognitive coaching system 500 is consistent with cognitive coaching system 102 of FIG. 1. In various embodiments, cognitive coaching system 500 performs any of the actions described in FIGS. 2-4D. In some embodiments, cognitive coaching system 500 executes instructions for one or more of the actions described in FIGS. 2-3B and utilizes/generates one or more heat maps, such as shown in FIGS. 4A-4D.

The cognitive coaching system 500 includes a memory 525, storage 535, an interconnect (e.g., BUS) 520, one or more CPUs 505 (also referred to as processors 505 herein), an I/O device interface 510, I/O devices 512, and a network interface 515 coupled to a network 550.

Each CPU 505 retrieves and executes programming instructions stored in the memory 525 or storage 535. The interconnect 520 is used to move data, such as programming instructions, between the CPUs 505, I/O device interface 510, storage 535, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 535 is generally included to be representative of a non-volatile memory, such as a hard disk drive, solid state device (SSD), removable memory cards, optical storage, or flash memory devices. In an alternative embodiment, the storage 535 can be replaced by storage area-network (SAN) devices, the cloud, or other devices connected to the anomaly detection system 500 via the I/O devices interface 510 or a network 550 via the network interface 515.

In some embodiments, the memory 525 stores instructions 526 and the storage 535 stores local data 540 and one or more datasets 545. However, in various embodiments, the instructions 526, the local data 540, and the one or more datasets 545 are stored partially in memory 525 and partially in storage 535, or they are stored entirely in memory 525 or entirely in storage 535, or they are accessed over the network 550 via the network interface 515.

Local data 540 can be consistent with local data 116 of FIG. 1. Local data 540 can include a history of visual data generated by the devices (e.g., IoT host device 120, IoT remote device 126, and IoT device 132) including, but not limited to, game film.

Dataset 545 can include historical statistics (e.g., box score, stat sheet, etc.) and motion recording data (e.g., video) (hereinafter referenced and encompassed as image data) not obtained from the devices (e.g. IoT host device 120, IoT remote device 126, and IoT device 132).

The instructions 526 are processor executable instructions including heat map generating instructions 527, historical detection instructions 528, image classifying instructions 529, and outcome predicting instructions 530. Heat map generating instructions 527 can be executed by cognitive training system 500 to generate one or more real-time heat maps based on real-time in-game strategic insight recorded from one or more devices comprised in an IoT environment. Heat map generating instructions 527 can be configured to perform, for example, operations 210 of FIG. 2. In some embodiments, Heat map generating instructions 527 are consistent with heat map generator 106 of FIG. 1. Heat map generating instructions 527 are further consistent with real-time heat map generator 305 of FIG. 3A. In some alternative embodiments, heat map generating instructions 527 comprise aspects of heat map simulator 310 of FIG. 3B.

Historical detection instructions 528 can be executed by cognitive coaching system 500 to detect one or more opposing player dynamic and look up historical real time heat maps. Historical detection instructions 528 can be configured to perform portions of operations 210 and operation 240 of FIG. In some embodiments, historical detection instructions 528 are consistent with historical heat map library 108 of FIG. 1. Historical detection instructions 528 are further consistent with historical heat map library 330 of FIGS. 3A and 3B.

Image classifying instructions 529 can be executed by cognitive coaching system 500 to identify similar games or scenarios by analyzing real-time heat maps. Image classifying instructions 529 can further be comprised to image analytic analysis between historical and real-time heat maps. image classifying instructions 529 can perform portions of operations 220-230 of FIG. 2 and in some embodiments, image classifying instructions 529 are consistent with analytics module 110 of FIG. 1. Image classifying instructions 529 are further consistent with heat map image classifier 320 of FIGS. 3A and 3B.

Outcome predicting instructions 530 can be executed by cognitive coaching system 500 to generate a corrective action and output a favorable strategic deployment. Outcome predicting instructions 530 can perform portions of method 250 of FIG. 2 and in some embodiments, outcome predicting instructions 530 are consistent with predictive module 112 of FIG. 1. Outcome predicting instructions 530 are further consistent with predictive module 340 of FIGS. 3A and 3B.

In various embodiments, the I/O devices 512 includes an interface capable of presenting information and receiving input (e.g., device 138 of FIG. 1). For example, I/O devices 512 can present information to a user (e.g., image classification) interacting with cognitive coaching system 500.

Cognitive coaching system 500 is connected to the network 550 via the network interface 515. In some embodiments, network 550 is consistent with network 150 of FIG. 1.

FIG. 5 is intended to represent illustrative components of an example cognitive coaching system 500 according to embodiments of the present disclosure. In some embodiments, however, individual components can have greater or lesser complexity than shown in FIG. 5, and components other than, or in addition to those shown in FIG. 5 can be present. Furthermore, in some embodiments, various components illustrated in FIG. 5 can have greater, lesser, or different functionality than shown in FIG. 5.

Figure 6:
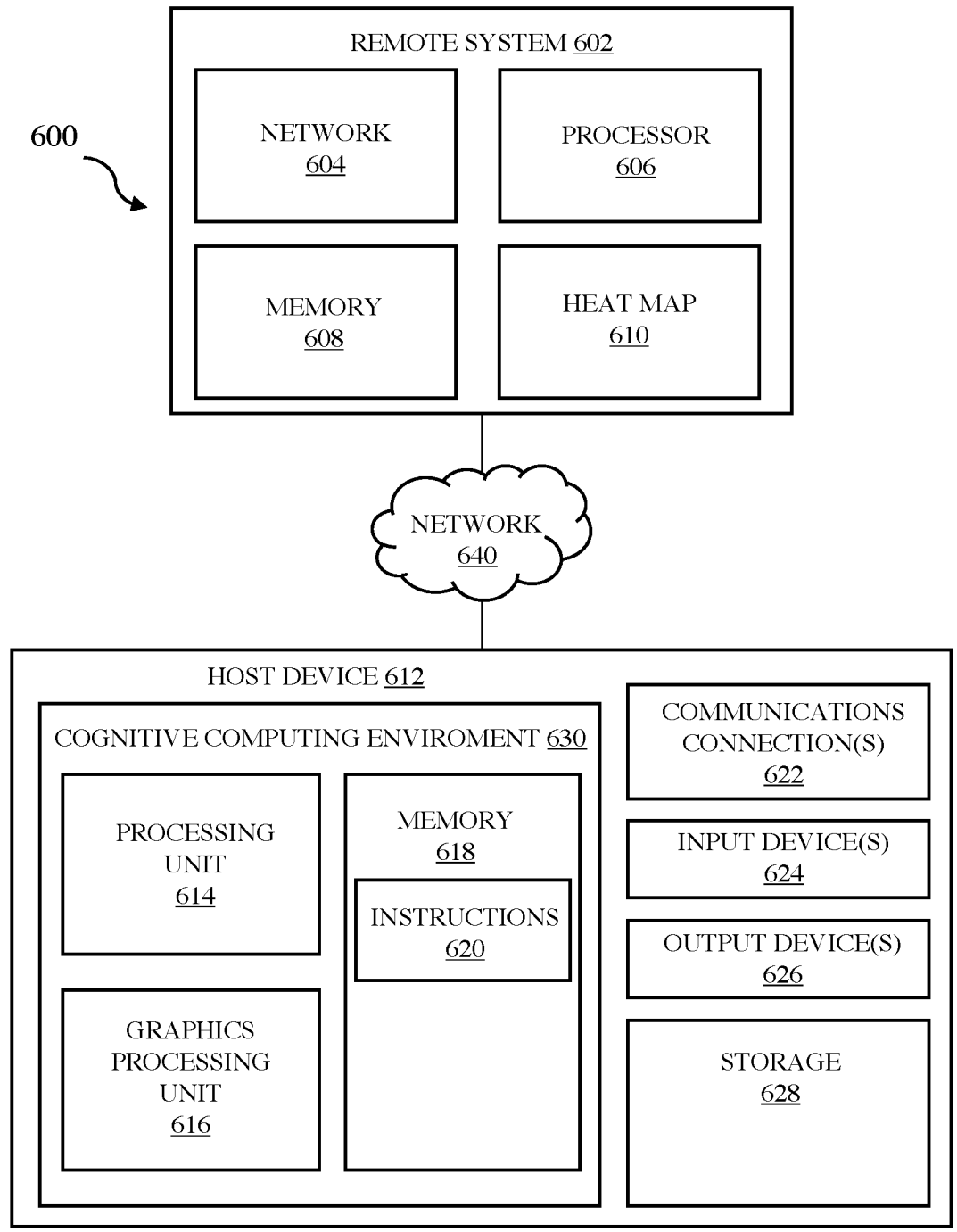
FIG. 6 is a block diagram illustrating an example computer environment, in accordance with embodiments of the present disclosure.

FIG. 6 depicts a block diagram of an example computing environment 600 in which embodiments of the present disclosure can be implemented. In some embodiments, aspects of computing environment 600 can perform the methods described in one or more of FIGS. 1-3B and utilize/generate one or more heat map in FIGS. 4A-4D. In the embodiment shown in FIG. 6, the computing environment 600 includes a remote system 602 and a host device 612.

According to embodiments, the host device 612 and the remote system 602 can be computer systems. The remote system 602 and the host device 612 can include one or more processors 606 and 614 and one or more memories 608 and 618, respectively. The remote system 602 and the host device 612 can be configured to communicate with each other through an internal or external network interface 604 and communications connection(s) 620 (e.g., modems or interface cards). The remote system 602 and/or the host device 612 can be equipped with a display or monitor. Additionally, the remote device 602 and/or the host device 612 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote system 602 and/or the host device 612 can be servers, desktops, laptops, or hand-held devices.

The remote system 602 and the host device 612 can be distant from each other and can communicate over a network 640. In embodiments, the host device 612 can be a central hub from which a remote system 602 and other remote devices (not pictured) can establish a communication connection, such as in a client-server networking model. In some embodiments, the host device 612 and remote system 602 can be configured in any other suitable network relationship (e.g., in a peer-to-peer configuration or using another network topology).

In embodiments, the network 640 can be implemented using any number of any suitable communications media. For example, the network 640 can be a wide area network (WAN), a local area network (LAN), the Internet, or an intranet. In certain embodiments, the remote system 602 and the host device 612 can be local to each other, and communicate via any appropriate local communication medium. For example, the remote system 602 and the host device 612 can communicate using a local area network (LAN), one or more hardwire connections, a wireless link or router, or an intranet. In some embodiments, the remote system, the host device 612, and any other devices can be communicatively coupled using a combination of one or more networks and/or one or more local connections. For example, the remote system 602 can be hardwired to the host device 612 (e.g., connected with an Ethernet cable) while a second device (not pictured) can communicate with the host device using the network 640 (e.g., over the Internet).

In some embodiments, the network 640 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 640.

In some embodiments, the host device 612 can include input device(s) 624 and output device(s) 626 directly. The host device 612 can contain subcomponents, such as a cognitive computing environment 630. The computing environment 630 can include a processing unit 614, a graphics processing unit 616, and a memory 618. Memory 618 comprises instructions 620. In embodiments, instructions 620 can be executed by processing unit 614 to perform at least part of one or more of the operations discussed above with respect to FIGS. 1-5. Instructions 620 can further be similar to instructions 526 of FIG. 5. The computing environment 630 can be configured to perform processing to ingest heat map 610 from remote system 602. In various embodiments, heat map 610 comprises generated real-time and historical heat maps. The storage 628 can be configured to store the heat map 610, for further processing.

While FIG. 6 illustrates a computing environment 600 with a single host device 612 and a single remote system 602, suitable computing environments for implementing embodiments of this disclosure can include any number of remote devices and host devices. The various models, modules, systems, instructions, and components illustrated in FIG. 6 can exist, if at all, across a plurality of host devices and remote devices.

It is noted that FIG. 6 is intended to depict representative components of an example computing environment 600. In some embodiments, however, individual components can have greater or lesser complexity than as represented in FIG. 6, components other than or in addition to those shown in FIG. 6 can be present, and the number, type, and configuration of such components can vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
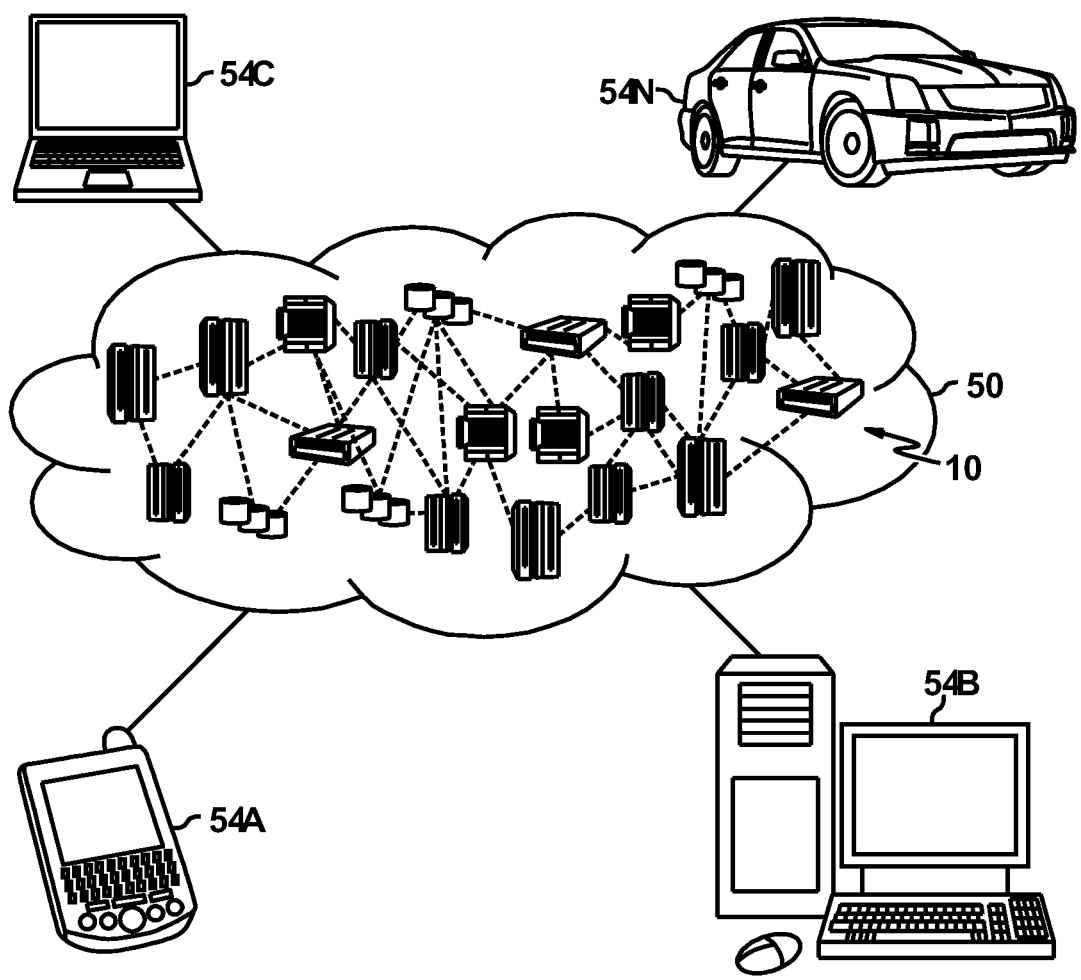
FIG. 7 depicts a cloud computing environment according to some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
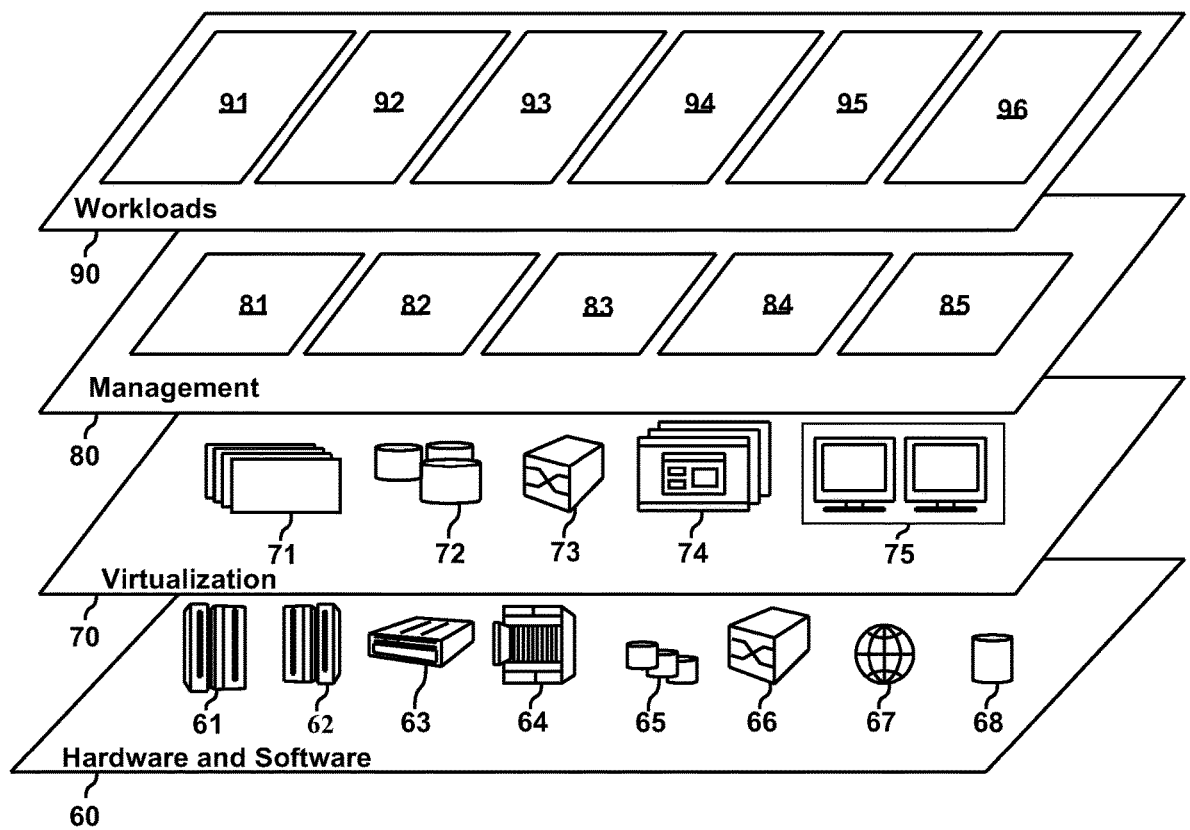
FIG. 8 depicts abstraction model layers according to some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive coaching 96.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any subset of the functionality described with respect to FIGS. 1-7) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cognitive coaching method comprising:
receiving data from a plurality of devices during one or more game phases;
generating, with a heat map generator, one or more real-time heat maps during the one or more game phases based on the data received from the plurality of devices;
detecting one or more real-time specific action occurrences during the one or more game phases by using a heat map image classifier to identify one or more patterns in pixel values of the one or more real-time heat maps that correlate to the one or more real-time specific action occurrences;
classifying the one or more real-time heat maps with one or more specific action labels based on the detected one or more real-time specific action occurrences;
identifying one or more historical heat maps stored in a historical heat map library based on the one or more specific action labels, wherein the one or more identified historical heat maps include at least one of the one or more specific action labels;

transposing the one or more identified historical heat maps onto the one or more generated real-time heat maps, in real time during the one or more game phases;

comparing data points of the one or more real-time heat maps with data points of the one or more transposed heat maps;

in response to determining that a similarity of data points between the one or more real-time heat maps and the one or more transposed heat maps matches a confidence level, analyzing, using a predictive module, a future potential outcome based on the one or more transposed heat maps; and signaling, to a user, a recommended corrective action deployment strategy based on the analysis of the future potential outcome.

2. The method of claim 1, further comprising:

determining that an unfavorable future potential outcome is likely to occur;

simulating one or more potential in-game deployable strategies, in response to a determination that the unfavorable future potential outcome does not satisfy the confidence level, in one or more iterations of heat map generating; and alerting the user that a predicted outcome of the one or more potential in-game deployable strategies satisfies the confidence level.

3. The method of claim 2, wherein determining evaluates similarities existing between the one or more historical heat maps and the one or more generated real-time heat maps against a confidence level during the detected one or more real-time specific action occurrences.

4. The method of claim 2, wherein simulating is performed until a number of similarities existing between the one or more historical heat maps and the one or more generated real-time heat maps falls below a threshold at one or more real-time specific action occurrences.

5. The method of claim 1, wherein the one or more generated real-time heat maps are a representative configuration for one or more of an individual player, an ensemble of players, or a team at a given point in real-time.

6. The method of claim 5, wherein the one or more generated real-time heat maps visually represent one or more in-game dynamic, wherein one or more in-game dynamic can comprise opposing team possession, accumulated player positioning during one or more game phase, one or more player point of view, and opposing team performance metrics, wherein one or more opposing team metric can comprise and indication of one or more player specific action occurrence.

7. The method of claim 1, wherein an analytics module is responsible for transposing the one or more historical heat maps, wherein the analytics module can be configured to run an object classifier, wherein the analytics module uses image analytics to identify similar games and/or scenarios in the one or more generated real-time heat maps by detecting patterns of historical heat maps generated in the historical heat map library.

8. A cognitive coaching system, the system comprising:

a computer readable storage medium configured to store instructions;

a user interface configured to receive input and present output; and a processor communicatively coupled to the computer readable storage medium and to the user interface, the processor configured to execute the instructions stored on the computer readable storage medium to:

receive data from a plurality of devices during one or more game phases;

generate, with a heat map generator, one or more real-time heat maps during the one or more game phases based on the data received from the plurality of devices;

detect one or more real-time specific action occurrences during the one or more game phases by using a heat map image classifier to identify one or more patterns in pixel values of the one or more real-time heat maps that correlate to the one or more real-time specific action occurrences;

classify the one or more real-time heat maps with one or more specific action labels based on the detected one or more real-time specific action occurrences;

identify one or more historical heat maps stored in a historical heat map library based on the one or more specific action labels, wherein the one or more identified historical heat maps include at least one of the one or more specific action labels;

transpose the one or more identified historical heat maps onto the one or more generated real-time heat maps, in real time during the one or more game phases;

compare data points of the one or more real-time heat maps with data points of the one or more transposed heat maps;

in response to determining that a similarity of data points between the one or more real-time heat maps and the one or more transposed heat maps matches a confidence level, analyze, using a predictive module, a future potential outcome based on the one or more transposed heat maps; and signal, to a user, a recommended corrective action deployment strategy based on the analysis of the future potential outcome.

9. The system of claim 8, further comprising:

determining that an unfavorable future potential outcome is likely to occur;

simulating one or more potential in-game deployable strategies, in response to a determination that the unfavorable future potential outcome does not satisfy the confidence level, in one or more iterations of heat map generating; and alerting the user that a predicted outcome of the one or more potential in-game deployable strategies satisfies the confidence level.

10. The system of claim 9, wherein determining evaluates similarities existing between the one or more historical heat maps and the one or more generated real-time heat maps against a confidence level during the detected one or more real-time specific action occurrences.

11. The system of claim 9, wherein simulating is performed until a number of similarities existing between the one or more historical heat maps and the one or more generated real-time heat maps falls below a threshold at one or more real-time specific action occurrences.

12. The system of claim 8, wherein the one or more generated real-time heat maps are a representative configuration for one or more of an individual player, an ensemble of players, or a team at a given point in real-time.

13. The system of claim 12, wherein the one or more generated real-time heat maps visually represent one or more in-game dynamic, wherein one or more in-game dynamic can comprise opposing team possession, accumulated player positioning during one or more game phase, one or more player point of view, and opposing team performance metrics, wherein one or more opposing team metric can comprise and indication of one or more player specific action occurrence.

14. The system of claim 8, wherein an analytics module is responsible for transposing the one or more historical heat maps, wherein the analytics module can be configured to run an object classifier, wherein the analytics module uses image analytics to identify similar games and/or scenarios in the one or more generated real-time heat maps by detecting patterns of historical heat maps generated in the historical heat map library.

15. A computer program product for cognitive coaching, the computer program product comprising a computer readable storage medium having program instructions embodied therewith, the program instructions executable by a processor to cause the processor to:
    receive data from a plurality of devices during one or more game phases;
    generate, with a heat map generator, one or more real-time heat maps during the one or more game phases based on the data received from the plurality of devices;
    detect one or more real-time specific action occurrences during the one or more game phases by using a heat map image classifier to identify one or more patterns in pixel values of the one or more real-time heat maps that correlate to the one or more real-time specific action occurrences;
    classify the one or more real-time heat maps with one or more specific action labels based on the detected one or more real-time specific action occurrences;
    identify one or more historical heat maps stored in a historical heat map library based on the one or more specific action labels, wherein the one or more identified historical heat maps include at least one of the one or more specific action labels;
    transpose the one or more identified historical heat maps onto the one or more generated real-time heat maps, in real time during the one or more game phases;
    compare data points of the one or more real-time heat maps with data points of the one or more transposed heat maps;
    in response to determining that a similarity of data points between the one or more real-time heat maps and the one or more transposed heat maps matches a confidence level, analyze, using a predictive module, a future potential outcome based on the one or more transposed heat maps; and
    signal, to a user, a recommended corrective action deployment strategy based on the analysis of the future potential outcome.

16. The computer program product of claim 15, further comprising:
    determining that an unfavorable future potential outcome is likely to occur;
    simulating one or more potential in-game deployable strategies, in response to a determination that the unfavorable future potential outcome does not satisfy the confidence level, in one or more iterations of heat map generating; and
    alerting the user that a predicted outcome of the one or more potential in-game deployable strategies satisfies the confidence level.

17. The computer program product of claim 16, wherein determining evaluates similarities existing between the one or more historical heat maps and the one or more generated real-time heat maps against a confidence level during the detected one or more real-time specific action occurrences.

18. The computer program product of claim 16, wherein simulating is performed until a number of similarities existing between the one or more historical heat maps and the one or more generated real-time heat maps falls below a threshold at one or more real-time specific action occurrences.

19. The computer program product of claim 15, wherein the one or more generated real-time heat maps are a representative configuration for one or more of an individual player, an ensemble of players, or a team at a given point in real-time; wherein the one or more generated real-time heat maps visually represent one or more in-game dynamic, wherein one or more in-game dynamic can comprise opposing team possession, accumulated player positioning during one or more game phase, one or more player point of view, and opposing team performance metrics, wherein one or more opposing team metrics can comprise and indication of one or more player specific action occurrence.

20. The computer program product of claim 15, wherein an analytics module is responsible for transposing the one or more historical heat maps, wherein the analytics module can be configured to run an object classifier, wherein the analytics module uses image analytics to identify similar games and/or scenarios in the one or more generated real-time heat maps by detecting patterns of historical heat maps generated in the historical heat map library.

* * * * *